(12) United States Patent
Arima et al.

(10) Patent No.: US 8,141,899 B2
(45) Date of Patent: Mar. 27, 2012

(54) CURTAIN AIRBAG DEVICE

(75) Inventors: Takashi Arima, Ibaraki (JP); Masanori Narita, Ibaraki (JP)

(73) Assignee: Autoliv Development AB, Vargarda (SE)

( * ) Notice: Subject to any disclaimer, the term of this patent is extended or adjusted under 35 U.S.C. 154(b) by 773 days.

(21) Appl. No.: 11/659,387

(22) PCT Filed: May 8, 2005

(86) PCT No.: PCT/JP2005/014384
§ 371 (c)(1),
(2), (4) Date: Oct. 27, 2008

(87) PCT Pub. No.: WO2006/013955
PCT Pub. Date: Feb. 9, 2006

(65) Prior Publication Data
US 2011/0266779 A1 Nov. 3, 2011

(30) Foreign Application Priority Data
Aug. 6, 2004 (JP) .................................. 2004-231538

(51) Int. Cl.
*B60R 21/213* (2011.01)
*B60R 21/214* (2011.01)
(52) U.S. Cl. .................................. 280/730.2; 280/743.1
(58) Field of Classification Search .................. 280/729, 280/730.2, 742, 743.1, 743.2
See application file for complete search history.

(56) References Cited

U.S. PATENT DOCUMENTS

| | | | |
|---|---|---|---|
| 6,371,512 B1 | 4/2002 | Asano et al. | |
| 6,626,456 B2 * | 9/2003 | Terbu et al. | 280/728.2 |
| 6,786,506 B2 * | 9/2004 | Yasuhara et al. | 280/730.2 |
| 6,796,576 B2 * | 9/2004 | Aoki et al. | 280/730.2 |
| 7,077,425 B2 | 7/2006 | Ogawa et al. | |
| 2003/0006589 A1 * | 1/2003 | Aoki et al. | 280/730.2 |

(Continued)

FOREIGN PATENT DOCUMENTS

DE 10343214 A1 4/2004

(Continued)

OTHER PUBLICATIONS

Definition: Area, Cambridge Dictionary of American English, available at, http://dictionaries.cambridge.org/define.asp?key=area*1+0&dict=A (last visited on Aug. 28, 2011)(area: "An area is also a particular part of anything that takes space").*

(Continued)

*Primary Examiner* — Joseph Rocca
(74) *Attorney, Agent, or Firm* — Harness, Dickey & Pierce, P.L.C.

(57) ABSTRACT

A curtain air bag device which allows a bag main body to expansively spread more quickly and reliably. A curtain air bag device comprises a bag main body received inside a head lining disposed on the window upper edge of a vehicle and designed to expansively spread from the lower end of the head lining toward the interior of the vehicle at the time of actuation; and a gas supply device for supplying expansion gas to the bag main body. The bag main body has a plurality of chambers which expand during operation; and a duct extending above the chambers along the window upper edge to distribute the gas to respective chambers. Further, the duct has an expansion region where the lower end is disposed lower than the lower end of the head lining during spreading.

16 Claims, 3 Drawing Sheets

U.S. PATENT DOCUMENTS

| | | | |
|---|---|---|---|
| 2003/0116947 A1* | 6/2003 | Yokoyama et al. | 280/730.2 |
| 2004/0075257 A1 | 4/2004 | Ogawa et al. | |
| 2004/0164530 A1* | 8/2004 | Sunabashiri | 280/730.2 |

FOREIGN PATENT DOCUMENTS

| | | |
|---|---|---|
| EP | 0980796 A2 | 2/2000 |
| EP | 1 112 900 A2 | 4/2001 |
| EP | 1 484 222 A | 12/2004 |
| JP | 2000-52907 A | 2/2000 |
| JP | 2003-200810 A | 7/2003 |
| JP | 2004-148867 A | 5/2004 |
| WO | WO 03/076236 | 9/2003 |

OTHER PUBLICATIONS

Search Report for PCT/JP2005/014384, ISA/JP, mailed Oct. 25, 2005.

Supplementary European Search Report and European Search Opinion for EP 05 76 8749.

EPO Office Action for parallel application EP 05 768 749.3-1523, completed Dec. 7, 2009.

* cited by examiner

[Fig. 1]
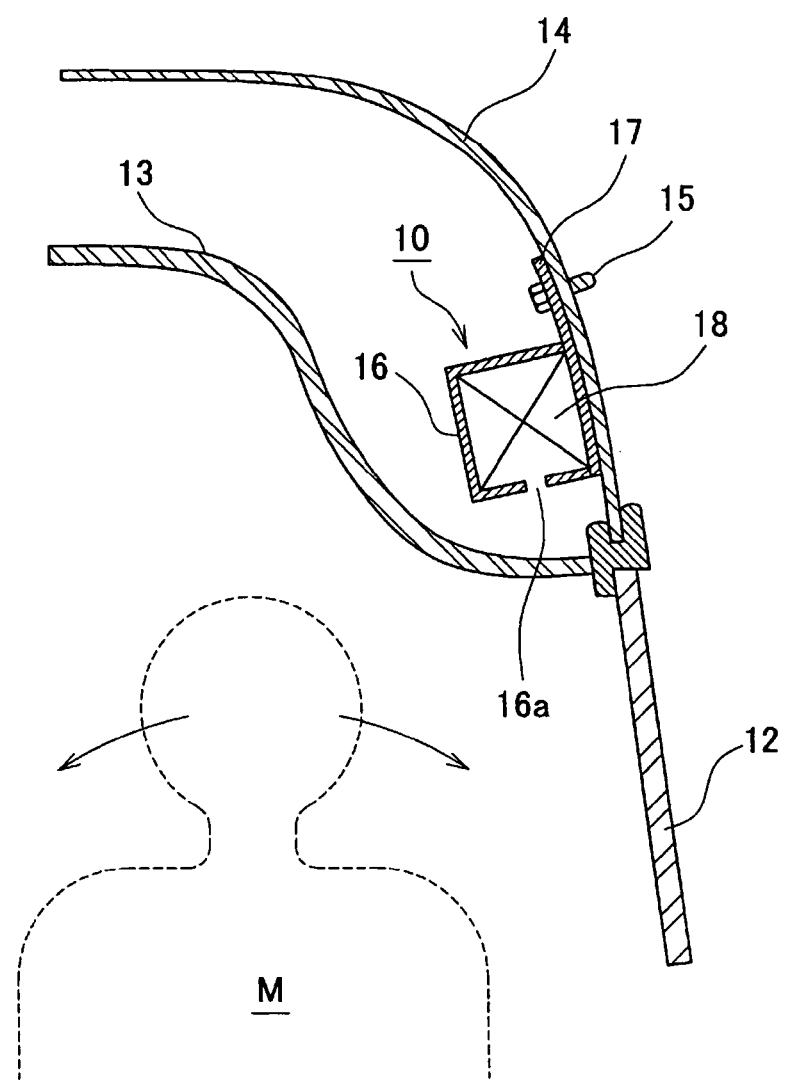

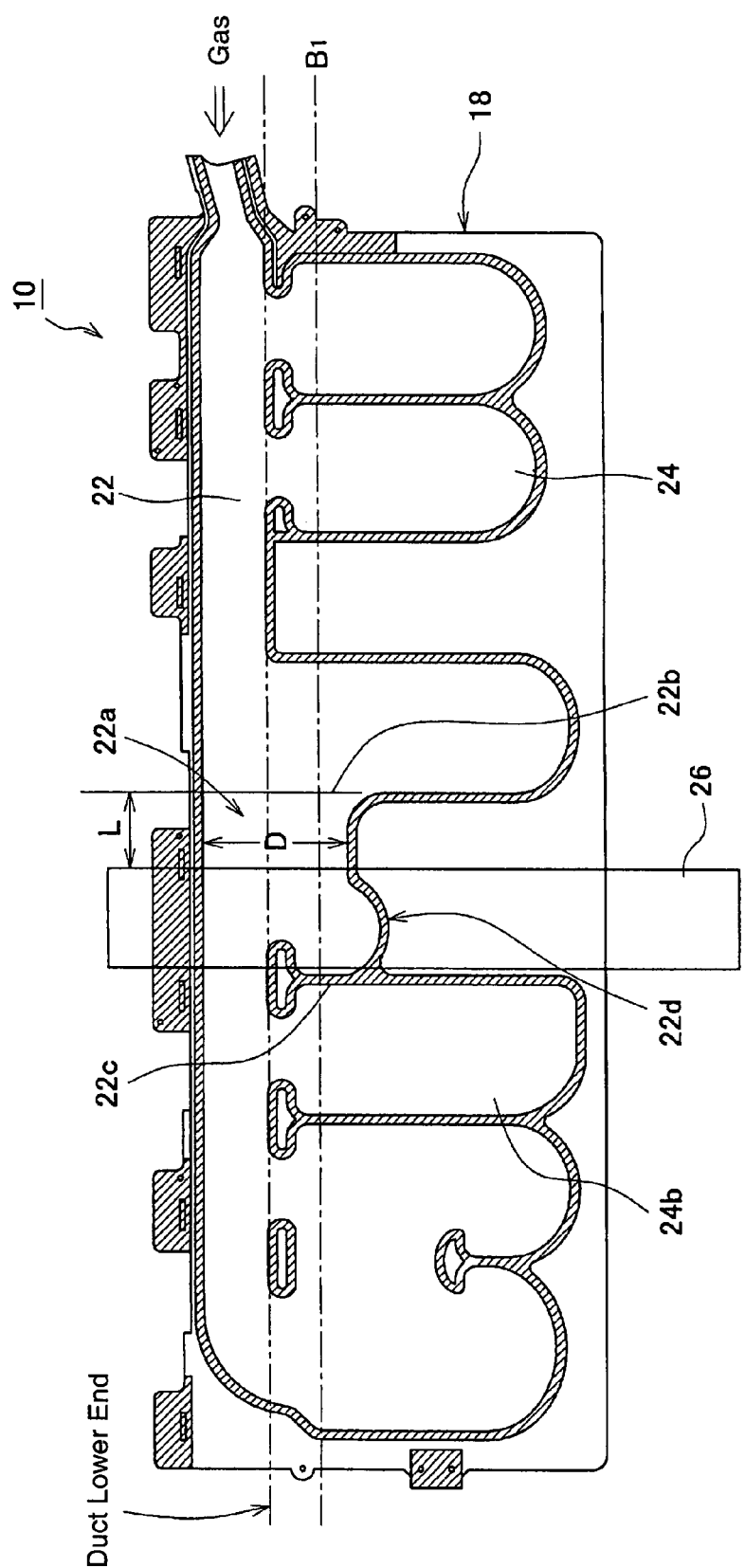
[Fig. 2]

[Fig. 3]
(A)
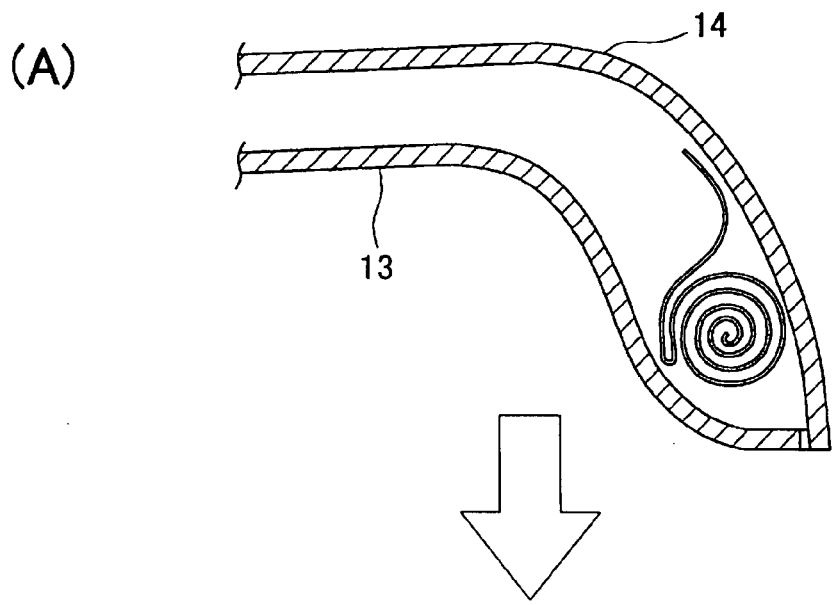
(B)
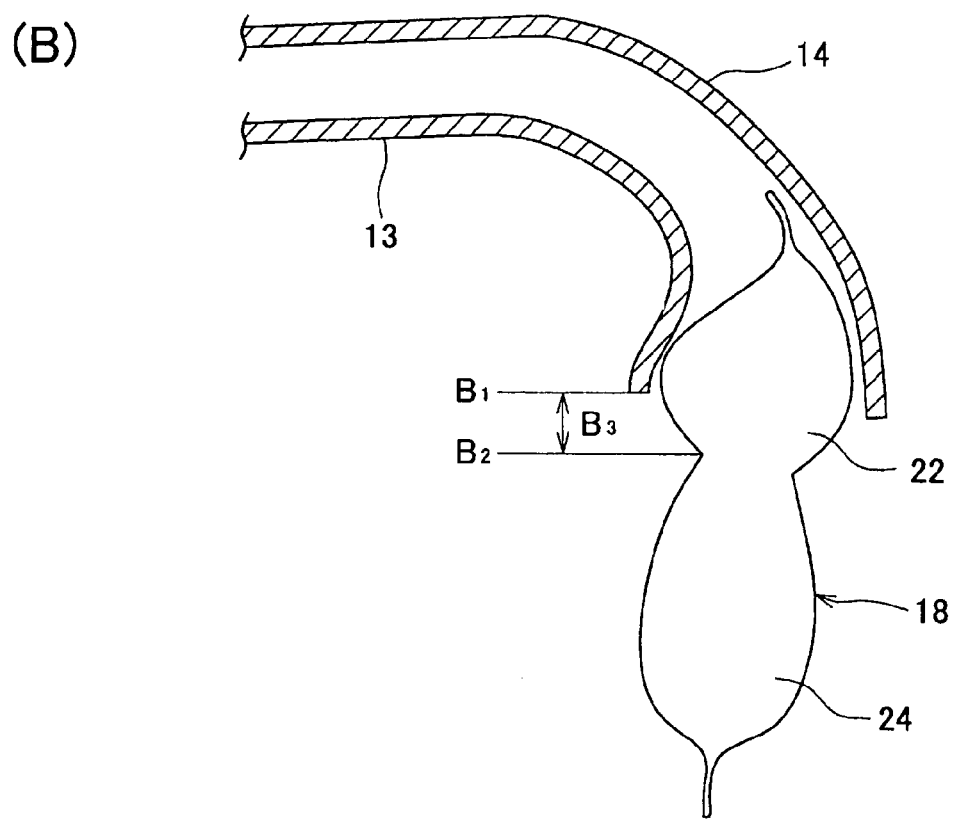

CURTAIN AIRBAG DEVICE

CROSS-REFERENCE TO RELATED APPLICATIONS

This application is a U.S. National Stage Application of International application No. PCT JP2005/014384, filed May 8, 2005. This application claims the benefit of Japanese Application JP2004-231538, filed Jun. 8, 2004. The disclosure(s) of the above applications are incorporated herein by reference.

FIELD

The present invention relates to a curtain airbag device that deploys an airbag (bag main body) in a curtain shape inside a window during a vehicle emergency (rollover, side collision, rolling, or the like) to protect a passenger.

BACKGROUND

When a vehicle experiences a side collision (side impact), a pillar (center pillar in particular) may be significantly deformed, and, in some cases, the bag main body is unable to deploy easily. That is to say, even when the bag main body expands internally, the head lining cannot detach easily, and there is a possibility of delayed deployment time of the bag main body, and insufficient passenger restraint.

SUMMARY

In consideration of the above situation, an object of the present invention is to provide a curtain airbag device in which the bag main body can inflate and deploy more quickly and reliably.

In order to solve the above problems, a curtain airbag device according to a first aspect of the present invention comprises: a bag main body that is housed inside a head lining disposed on a window upper edge of a vehicle, and that inflates and deploys from a lower end of the head lining towards an inside of the vehicle cabin when operated; and a gas supply device that supplies inflation gas to the bag main body. The bag main body has: a plurality of chamber sections that inflate when operated; and a duct section that extends along the window upper edge above the chamber sections and that distributes gas into the respective chamber sections. Moreover, the duct section has an expansion area, a lower end of which is positioned below a lower end of the head lining when deployed.

Furthermore, a curtain airbag device according to a second aspect of the present invention comprises: a bag main body that is housed inside a head lining disposed on a window upper edge of a vehicle, and that inflates and deploys from a lower end of the head lining towards the vehicle interior when operated; and a gas supply device that supplies inflation gas to the bag main body. The bag main body has: a plurality of chamber sections that inflate when operated; and a duct section that extends along the window upper edge above the chamber sections and that distributes the gas into the respective chamber sections. Moreover, the duct section has an expansion area that pushes open the head lining during deployment, and is configured so that the expansion area extends below a lower end of the duct section when deployed.

Since the structure of the airbag main body is such that the lower end of the duct section during deployment is positioned below the lower end of the head lining, the head lining is pushed open into the vehicle cabin side when the duct section inflates. Therefore, even when the pillar (center pillar in particular) deforms as a result of a side collision, the bag main body can be quickly and sufficiently deployed.

The expansion area is preferably formed at least in the proximity of a vehicle body pillar of the vehicle. Moreover, in the case of a configuration where the gas is supplied from one end of the duct section to the other end, it is preferable that the expansion area at least overlaps with the vehicle body pillar of the vehicle, and is formed large so that it protrudes on the gas upstream side of the pillar.

It is further preferable that the expansion area be of configuration in which it at least overlaps with the vehicle body pillar of the vehicle, and a border between the chamber section adjacent to the expansion area on the gas upstream side and the expansion area is open.

Moreover, it is preferable that the expansion area at least overlaps with the vehicle body pillar of the vehicle, and a border that blocks gas flow is provided between the chamber section adjacent to the expansion area on the gas downstream side and the expansion area.

In addition, a preferable that the expansion area be of a configuration in which it at least overlaps with the vehicle body pillar of the vehicle, and a lower end of a portion of the expansion area that overlaps with the vehicle body pillar is provided further below other portions of the expansion area.

In general, an inner panel (body panel) covered by a head lining (roof) is provided above a window glass on a side of a vehicle cabin. A side rail provided with a bracket (or bracket that serves as a side rail) is provided in a space formed by the head lining and the inner panel, and the side rail houses a bag main body of a curtain airbag. The side rail is fixed on the inner panel by a bolt or the like. When operated, the bag main body is inflated by gas supplied from an inflator, and it pushes open a lower periphery of the head lining and deploys into the vehicle cabin.

DRAWINGS

FIG. 1 is a sectional view that shows a vehicle cabin portion provided with a curtain airbag device according to an example of the present invention.

FIG. 2 is a longitudinal sectional view that shows a structure of an airbag main body used in the curtain airbag device according to the example.

FIG. 3 (A) and FIG. 3 (B) are sectional views that show the operation of the curtain airbag device according to the example.

DETAILED DESCRIPTION

Regarding the up-and-down directions, viewed from the center of the vehicle, the direction toward the ceiling of the vehicle is taken as the "up" direction and the direction toward the floor is taken as the "down" direction. Moreover, "upstream" and "downstream" are taken as being upstream and downstream of the gas flow, analogous to the flow of a river.

Hereinafter, an embodiment of the present invention is described, with reference to the drawings. FIG. 1 is a sectional view that shows a vehicle cabin portion provided with a curtain airbag according to an example of the present invention. As shown in FIG. 1, in a passenger vehicle type vehicle for example, a window glass 12 is provided on a side of a vehicle cabin. An inner panel 14 covered by a head lining 13 is provided above the window glass 12. A curtain airbag device 10 is fixed on the inner panel 14 with a bolt 15.

The curtain airbag 10 comprises: a bag main body 18 that is housed in a state of being covered by the head lining 13 disposed on a window upper edge of the vehicle, and that inflates and deploys downward from a gap between the head lining 13 and the inner panel 14 when operated, to protect a passenger M inside the vehicle; and a gas supply device (not shown in the drawing) that supplies inflation gas to the bag main body 18.

The curtain airbag device 10 is further provided with a laterally long sleeve-shaped side rail 16 provided along the upper section of the window glass 12, and a bracket 17 that supports the side rail 16. The bag main body 18 is housed within the side rail 16. The bag main body 18 may be a bag made with two overlapped sheets that have been sewed, adhered or welded to form a bag shape, or a bag section formed from a single sheet. Along the rail in the center of the bottom section of the side rail 16A, a tear line 16a is formed. In the case of emergency of the vehicle, this tear line 16a is opened by inflation and deployment of the bag main body 18 by supplying deployment gas, and the bag main body 18 is pushed out from the bottom section of the opened side rail 16. The side rail 16 that houses the bag main body 18 is fixed by the bolt 15 onto the inner panel 14 via the bracket 17. In the present example, the side rail 16 is used as described above. However, a configuration in which the bracket 17 is directly fixed on the bag main body 18 without using the side rail may be employed.

FIG. 2 shows the bag main body 18 in a deployed state. The bag main body 18 has: a plurality of chamber sections 24 that inflate when operated; and a duct section 22 that extends along the side rail 16 above the chamber sections 24 and that distributes gas into the respective chamber sections 24. The duct section 22 has an expansion area 22a that is formed so as to extend below the lower end of the duct section. It is further preferable that the lower end of the expansion area 22a when deployed is positioned below the lower end of the head lining 13 (depth is greater). The method of folding the bag main body 18 is not particularly limited, and various kinds of method including so-called "cornice folding" and "roll" may be employed.

Here, when the expansion area 22a and a chamber 24a that is adjacent to the expansion area 22a on the gas upstream side are practically connected and a border portion 22b between them is open, a rapid gas flow can be achieved and this expansion area 22a rapidly deploys, and the head lining 13 can be pushed opened more reliably. If a border 22c that interrupts the flow of gas is provided between the expansion area 22a and a chamber 24b that is adjacent to the expansion area 22a on the gas downstream side, the gas that has flowed into the expansion area 22a becomes likely to stay and it is more effective for pushing open the head lining 13. It is preferable if a portion 22d of the expansion area 22a that overlaps with a pillar 26, extends further below other portions of the expansion area 22a, and the lower end of the portion 22d is provided further below the lower end section of the other portion of the expansion area 22a, because gas is more effectively retained in the expansion area 22a and the head lining can be further reliably pushed open.

FIGS. 3 (A) and (B) respectively show states of the bag main body 18 being housed when not operated and when deployed. Furthermore, members such as the side rail 16 are omitted in the drawing to simplify description. As shown in FIG. 3 (B), in the expansion area 22a of the duct section 22, a lower end B2 when deployed is positioned below a lower end B1 of the head lining 13 by a distance B3. As is also shown in FIG. 2, the expansion area 22a is in a position where it at least overlaps with the pillar 26, and preferably it is formed so as to extend to the gas upstream side (right side in the drawing). In other words, the position of the expansion area 22a significantly protrudes to the gas upstream side. In this way, the expansion area 22a is preferably formed larger than the width of the pillar 26. In particular, by having a shape that protrudes to the gas upstream side of the pillar 26 (right side in the drawing), even in the case where the pillar 26 is deformed as a result of a side collision, the effect of the collision is reduced and the head lining 13 can be reliably pushed open to allow smooth deployment. Furthermore, in the present example, the "expansion area 22a" that is wide in the downward direction is formed in one portion of the duct section 22. However, this may be formed across the entire duct section 22.

The curtain airbag device according to the present invention can be applied not only to a passenger type vehicle but also of course to various types of vehicle such as a mini-van type vehicle.

If an emergency situation such as rollover, side collision or overturning sideways occurs while the vehicle is traveling, a sensor provided in the vehicle senses unusual vibrations, and, based on this signal, transmits a trigger signal to an inflator (gas generation device) not shown in the drawing. A propellant that drives the inflator in response to the trigger signal from the sensor is provided inside the inflator, and the inflator is operated by the propellant. By the operation of the inflator, deployment gas is supplied from an end section opening of the duct section 22 of the bag main body 18.

The gas that flows in the duct section 22 from the right to the left direction in FIG. 2 is distributed into the chamber sections 24 provided along the way. As the bag main body 18 inflates, the tear line 16a formed on the bottom section of the side rail 16 is opened, and the head lining 13 positioned beneath the side rail 16 is pushed open (burst open). Subsequently, the bag main body 18 slides vertically downward, guided by the window glass 12, and covers a side surface of the window glass 12 to protect the passenger (M).

In the present example, since the depth D (FIG. 2) of the duct section 22 is made large in the vicinity of the pillar 26, as shown in FIG. 3 (B), the head lining 13 can be pushed open reliably and widely allowing the bag main body 18 to be quickly and reliably deployed. Therefore, even in the case where the pillar 26 is deformed as a result of side collision, the effect of the collision is reduced and the expansion operation of the airbag can be made more reliable and dependable.

An example of the present invention has been described. However, the present invention is not limited to the aforementioned example, and various design modifications may be made without departing from the scope of the technical concept described in the claims.

EXPLANATION OF THE REFERENCE SYMBOLS

10 Curtain airbag device
13 Head lining
14 Inner panel
18 Bag main body
22 Duct section
22a Expansion area
24 Chamber section
26 Pillar

The invention claimed is:

1. A curtain airbag device comprising:
a bag main body housed inside a head lining adapted to be disposed on a window upper edge of a vehicle, the main body deployable from a lower end of said head lining towards the vehicle interior when operated, said bag main body having a plurality of chamber sections that inflate when operated;
a duct section that horizontally extends from an upstream end to a downstream end along said window upper edge above said chamber sections, said duct section for distributing an inflation gas from a gas supply device into the respective chamber sections, said duct section having an upper end and a lower end, the lower end of said duct section positioned above the lower end of said head lining when deployed; and
an expansion area that extends from said duct section, the expansion area configured such that said expansion area extends below said lower end of said duct section when deployed, and pushes open the head lining during deployment, the expansion area partially connected to an adjacent upstream chamber section lying on an upstream side of the expansion area such that an upper portion of the adjacent upstream chamber section is horizontally in direct fluid communication with the expansion area and the expansion area is separated from an adjacent downstream chamber section in a horizontal direction.

2. The curtain airbag device according to claim 1, wherein at least a portion of said expansion area is positioned over a vehicle body pillar of said vehicle.

3. The curtain airbag device according to claim 1, in combination with said gas supply device.

4. The curtain airbag device according to claim 3, wherein said gas supply device supplies said gas from one end of said duct section to the other end.

5. The curtain airbag device according claim 4, wherein said expansion area at least overlaps with a vehicle body pillar of said vehicle, and is formed so that it extends to a gas upstream side of said pillar.

6. The curtain airbag device according to claim 4, wherein said expansion area at least overlaps with a vehicle body pillar of said vehicle, and a lower end of a portion of said expansion area that overlaps with the vehicle body pillar is provided further below other portions of said expansion area.

7. The curtain airbag device according to claim 1, wherein said expansion area at least overlaps with a vehicle body pillar of said vehicle, and is formed so that said expansion area extends to a gas upstream side of said pillar.

8. The curtain airbag device according to claim 1, wherein said expansion area at least overlaps with a vehicle body pillar of said vehicle, and gas flow from said expansion area to said adjacent downstream chamber section is blocked.

9. The curtain airbag device according to claim 1, wherein said expansion area at least overlaps with a vehicle body pillar of said vehicle, and a lower end of a portion of said expansion area that overlaps with the vehicle body pillar is provided further below other portions of said expansion area.

10. The curtain airbag device according to claim 1, wherein said expansion area is formed at least in the proximity of a vehicle body pillar of said vehicle.

11. The curtain airbag device according to claim 1, wherein a lower boundary of the expansion area is defined at least in part by a concave portion.

12. A curtain airbag for a vehicle comprising:
a duct adapted to be in fluid communication at an upstream end thereof with a gas supply device, the duct including a horizontally extending main duct portion and an expansion area in fluid communication with and downwardly extending from the main duct portion upon deployment; and
a plurality of chamber sections downwardly extending from the main duct section upon deployment of the curtain airbag, the plurality of chamber sections including at least an adjacent upstream chamber section adjacent to the expansion area on an upstream side thereof and an adjacent downstream chamber section adjacent to the expansion area on a downstream side thereof;
wherein an upper portion of the adjacent upstream chamber section is horizontally in direct fluid communication with the expansion area and the expansion chamber is separated from the adjacent downstream chamber section in a horizontal direction.

13. The curtain airbag according to claim 12, wherein a first distance is defined at an intersection of the adjacent upstream chamber section and the expansion area between a lower end of the expansion area and the upper end of the duct and a second distance is defined at an intersection of the adjacent downstream chamber section and the expansion area between an upper end of the duct and an upper end of a physical barrier between the adjacent downstream chamber section and the expansion area, the first distance being greater than the second distance.

14. The curtain airbag according to claim 12, in combination with a gas supply device.

15. The curtain airbag according to claim 12, in combination with the vehicle, the expansion area overlying a pillar of a vehicle upon deployment.

16. The curtain airbag according to claim 12, wherein a lower end of the expansion area is defined at least in part by a concave portion.

* * * * *